United States Patent [19]

Yamaguchi et al.

[11] 4,031,031

[45] June 21, 1977

[54] METHOD FOR TREATING CATALYST USED FOR CATALYTIC REACTIONS OF HYDROCARBONS AT THE TIME OF CATALYST REMOVAL

[75] Inventors: Kineo Yamaguchi, Urawa; Katsuhiko Kawakami; Yukimasa Nakamoto, both of Kurashiki, all of Japan

[73] Assignee: Nippon Mining Co., Ltd., Tokyo, Japan

[22] Filed: Apr. 30, 1975

[21] Appl. No.: 573,231

[30] Foreign Application Priority Data

Apr. 30, 1974 Japan .............................. 49-47550

[52] U.S. Cl. .............................. 252/414; 134/25 R; 208/113; 208/213; 208/216; 208/305; 252/412
[51] Int. Cl.² ..................... B01J 21/20; B01J 23/94
[58] Field of Search .................. 252/414, 412, 413; 208/216, 305, 113, 213; 134/25 R

[56] References Cited

UNITED STATES PATENTS

| 2,515,062 | 7/1950 | Smith | 252/414 |
| 3,117,936 | 1/1964 | Michalko | 252/413 |
| 3,168,462 | 2/1965 | Erickson | 208/305 |
| 3,213,033 | 10/1965 | Hindin et al. | 252/414 |
| 3,838,066 | 9/1974 | Lovell | 252/419 |

*Primary Examiner*—Winston A. Douglas
*Assistant Examiner*—P. E. Konopka
*Attorney, Agent, or Firm*—Sughrue, Rothwell, Mion, Zinn & Macpeak

[57] ABSTRACT

A method of removing a catalyst used for catalytic reactions of hydrocarbons from a reaction system for exchange or otherwise comprising treating the catalyst with water or a mineral oil in the presence of a surface active substance or both a surface active substance and a chelating agent to wet the catalyst. This method ensures a safe and simple removal of the catalyst without involving dust scattering, spontaneous combustion or generation of sulfur dioxide gas.

10 Claims, No Drawings

METHOD FOR TREATING CATALYST USED FOR CATALYTIC REACTIONS OF HYDROCARBONS AT THE TIME OF CATALYST REMOVAL

BACKGROUND OF THE INVENTION

1. Field of the Invention

This invention relates to a method for treating a catalyst used for catalytic reaction of hydrocarbons when the catalyst is removed from the reaction system.

2. Description of the Prior Art

Generally, in the treatment (e.g., cracking or desulfurization) of hydrocarbons such as gasoline, kerosene or heavy oils in a catalytic reaction, the catalyst used in the reaction must be deactivated, or when the catalyst becomes contaminated, it needs to be removed from the reaction system and exchanged with a fresh catalyst. The previous practice in the removal of the catalyst has been to stop the reaction of a starting hydrocarbon feed oil (to be referred to hereinafter simply as a "feed oil") and removing the feed oil from the reaction system, and to wash the reaction system and the catalyst in the reaction system using a washing oil such as kerosene or a gas oil under appropriately selected temperature and pressure conditions. The catalyst so washed is then removed from the reaction system.

When, for example, a high boiling oil such as an atmospheric residue is used as the feed oil, the spent catalyst exists in a caked state, and therefore, the catalyst cake must be mechanically pulverized. A dust of the pulverized catalyst is generated as a result of, for example, impact at the time of removal, and the dust markedly degrades the working environment. Furthermore, even though the catalyst has been washed in most cases as mentioned above, the spent catalyst removed from the reaction system has adhered thereto, sulfur, iron, vanadium and other metals contained in the feed oil and carbon resulting from the cracking of the hydrocarbons in the feed oil. Accordingly, when the catalyst is removed into the atmosphere, the adhering matter is oxidized by oxygen in the air generating a heat of reaction, which in turn causes the adhering matter on the spent catalyst to burn, resulting in a spontaneous combustion of the spent catalyst. In addition, the sulfur adhering to the spent catalyst generates sulfur dioxide gas by oxidation, and markedly degrades the working environment.

Thus, in the conventional removal of spent or contaminated catalysts for exchange in catalytic reactions of hydrocarbons, the generation of dust, the occurrence of spontaneous combustion and the generation of sulfur dioxide gas causes remarkable difficulties in the removal operation.

SUMMARY OF THE INVENTION

An object of this invention is to provide a method for treating a catalyst used for catalytic reactions of hydrocarbons so as to remove the catalyst safely and simply without the above-described defects being involved.

Extensive investigations have been made on a method for treating the above-described catalyst so as to remove it safely and simply, and it has been found that when the catalyst is wet-treated with water or a mineral oil in the presence of a surface active substance or in the presence of a surface active substance and a chelating agent prior to removal from the reaction system, the catalyst becomes wetted, and as a result, the catalyst can be removed safely from the reaction system without involving a scattering of catalyst dust, a spontaneous combustion of the catalyst by the oxidation of matter adhering to the catalyst, or a generation of sulfur dioxide gas caused thereby.

According to this invention, there is provided a method for treating a catalyst used in the catalytic reaction of hydrocarbons when the catalyst is removed from the reaction system for exchange or otherwise, which comprises wetting the catalyst with water or a mineral oil in the presence of a surface active substance or both a surface active substance and a chelating agent and removing the catalyst from the catalyst from the reaction system.

DETAILED DESCRIPTION OF THE INVENTION

The catalysts to which the method of this invention can be applied include a wide range of catalysts used for catalytic reactions of hydrocarbons, for example, catalysts for the desulfurization of gasoline and kerosene, catalysts for the desulfurization and/or cracking of gas oils, and catalysts for the desulfurization and/or cracking of atmospheric residual oils and vacuum residual oils. More specifically suitable examples of catalysts to which the process of this invention is applicable include a Co-Ni-Mo catalyst and a Co-Mo catalyst, supported on alumina or silica-alumina, and the like, as disclosed in U.S. Pat. Nos. 2,880,171 and 3,383,301.

The surface active substance that can be used for wetting these catalysts at the time of removal is a substance which is adsorbed on the gas-liquid, liquid-liquid or solid-liquid interface and markedly changes the properties of the interface, when the water or mineral oil is used in the wetting treatment.

The chelating agent that can be used is a material which has the function of chelating ionizable substances. Suitable surface active substances include, for example, synthetic detergents including non-biodegradable (hard-type) alkylbenzene sulfonates (ABS) (e.g., tetrapropylbenzene sulfonate, etc.), synthetic detergents including biodegradable (soft-type) linear alkylbenzene sulfonates (LABS) (e.g., n-dodecylbenzene sulfonate, etc.), and sodium nitrite. Examples of suitable chelating agents include sodium ethylenediaminetetraacetate (EDTA), sodium nitrilotriacetate (NTA), and sodium gluconate. Generally, it is preferred to use these surface active substances and chelating agents as aqueous solutions at a concentration of at least about 0.1% by weight and up to 20% by weight, preferably 1 to 7% by weight. Furthermore, when water is used as the treating liquid, it is desirable to use an anti-corrosive agent in order to prevent a corrosion of the reaction apparatus. Suitable examples of an anti-corrosive agent which can be used include sodium hydroxide, sodium carbonate, sodium nitrite and the like. A suitable amount of the anti-corrosive agent is an amount such that the concentration thereof is several percent in the liquid medium. Of these, sodium hydroxide and sodium carbonate are used as a neutralizing agent, and sodium nitrite is used to passivate the metals used. The use of anti-corrosive agents and examples thereof are described in detail in the recommended practice of *NACE* (*National Association of Corrosion Engineers*), 1970.

When a mineral oil is used as the treating liquid, a wide range of oleophilic surface active substances can be used. Examples of suitable oleophilic surface active substances include benzotriazoles (e.g., 1,2,3-benzotriazole, etc.), pyrrolidones (e.g., n-methyl-2-pyrrolidone, 2-pyrrolidone, 3-pyrrolidone, etc.), indoles (e.g., indole, indoline, etc.), oleophilic anionic surface active agents (e.g., soaps such as alkali soaps and metal soaps, sulfonates such as alkyl sulfonates sulfates such as sulfonated oils (e.g., Turkey red oil), etc.), cationic active agents (e.g., sulfuric acid salts of an ethyleneoxide adduct of an amine, etc.), amphoteric surface active agents (e.g., vinyl sodium sulfonate, acrylic acid, etc.), and non-ionic surface active agents (e.g., polyethylene glycols, polyhydric alcohol esters, ester-ethers, etc.). Of these, compounds containing therein an N atom or an OH group as a polar group are preferred. Examples of anionic surface active agents are carboxylic acid soaps, sulfated oils, sulfuric acid esters of alcohols, ester-bond sulfuric acid esters, amide-bond sulfuric acid esters, ether-bond sulfuric acid esters, alkanesulfonic acids, ester-bond sulfonic acids, amide-bond sulfonic acids, lower alkylarylsulfonic acids and higher alkylarylsulfonic acids. The same chelating agents as exemplified above can be used equally well in this case.

Just as in the case of using water as the treating liquid, these surface active substances and chelating agents are preferably used in the mineral oil at a concentration of at least about 0.1% by weight and up to about 20% by weight, preferably 1 to 7% by weight. Suitable mineral oils which can be used in this invention generally include kerosene (b.p. about 160° to 220° C), gas oil (b.p. about 200° to 400° C) and atmospheric residual oil (b.p. about 300° C or higher), which can be obtained by the distillation of crude oil. Naphtha can also be used as the mineral oil in this invention, but it is not preferred from the standpoint of operational safety.

The amount of the surface active substance and chelating agent is adjusted by considering the above treating conditions since the amount thereof affects the wetting of the catalyst and the treating time even in the case of using water or a mineral oil as the treating liquid.

The wetting treatment of the catalyst with water or a mineral oil in the presence of the surface active substance or the surface active substance and the chelating agent can be carried out by adding the surface active substance or the surface active substance and the chelating agent to a washing oil containing a feed oil with which the catalyst in the reaction system is washed in accordance with the conventional method described above, thus wetting the catalyst at the time of washing it with the washing oil. Alternatively, the catalyst can be wetted with water or a mineral oil containing the surface active substance or the surface active substance and the chelating agent subsequent to the above washing treatment or immediately before the catalyst is removed from the reaction system.

Thus, examples of mineral oils which can be used as the wetting liquid include, for example, kerosene, gas oils and atmospheric residual oils which have a reduced asphaltene content and which are rich in aromatics. It will be evident that when water is used as the treating liquid, the wetting treatment should be carried out after washing the catalyst. Suitable treatment temperatures which can be used range from about room temperature (about 20°–30° C) to an elevated temperature. Although heating is not required, the treating liquid used for the wetting treatment can be advantageously heated to enhance the wetting effect of the surface active substance and the chelating agent. Generally, it is preferred to heat the treating liquid to a temperature of about 50° to 300° C.

When it is desired to treat catalysts used for the catalytic reaction of high boiling oils in accordance with this invention, it is effective to soften or loosen the spent catalyst by washing with a washing oil containing an organic amine compound (e.g., a polyethylene polyamine such as a di-, tri-, or tetra-ethylene di-, tri- or tetra-amine such as diethylene triamine) because the catalyst is caked as stated hereinabove. However, the caked catalyst can also be directly treated by the method of this invention.

Since the catalyst treated in accordance with this invention is wet, the catalyst is not reduced to a dust by, for example, impact at the time of removal, and there is no spontaneous combustion of the matter adhering to the catalyst as a result of oxidation nor any generation of sulfur dioxide gas caused thereby. Accordingly, the spent catalyst can be removed from the reaction system very safely and simply.

The present invention is therefore very beneficial in removing spent catalysts in catalytic reactions of hydrocarbons.

The following Examples are given to specifically illustrate the present invention in greater detail. Unless otherwise indicated, all parts, percents, ratios and the like are by weight.

EXAMPLE 1

In the removal of a catalyst used in an atmospheric residual oil desulfurizing unit, the spent catalyst and the inside of the unit were washed with a gas oil during a normal shut-down of the operation. After this washing operation, 1% of diethylene triamine was added to the gas oil while the washing temperature and pressure were maintained and the mixture was circulated continuously for another 20 hours. Then, 1% of benzotriazole as a surface active substance was added to the gas oil, and the mixture was circulated continuously for an additional 5 hours. Then, the operation was completely stopped. After the stopping of the operation, the gas oil within the reactor loaded with the spent catalyst was sufficiently purged off, and the reactor was opened to remove the spent catalyst. No dust scattering nor spontaneous combustion of the catalyst occurred during the removal of the spent catalyst.

EXAMPLE 2

In the removal of a catalyst used for the desulfurization of vacuum gas oil, the catalyst and the inside of the desulfurization unit were washed by circulating a feed gas oil in a normal course of shut-down of the operation. After this washing operation, 1% of diethylene triamine was added to the vacuum gas oil while maintaining the washing temperature and pressure unchanged. The mixture was circulated for an additional 10 hours.

Then, 1% of benzotriazole was added to the above vacuum gas oil, and the mixture was circulated continuously for 5 hours. The operation was then completely stopped. After the stopping of the operation, the vacuum gas oil in the reactor loaded with the spent catalyst was sufficiently purged off, and the reactor was opened to remove the spent catalyst. No dust scattering nor spontaneous combustion was observed at this time.

EXAMPLES 3 TO 9

In these Examples, the spent catalyst removed from the reactor of a residual oil desulfurizing unit by the method described in Example 1 was (1) treated with hydrogen and hydrogen sulfide to increase its oxidizability, then (2) wetted with a surface active substance and/or a chelating agent, and (3) subjected to the following oxidation test in order to demonstrate that spontaneous combustion can be prevented.

Oxidation Test Method

Equal amounts of the spent catalyst of the same quality were filled in two gas-absorbing bottles A and B, and a thermostat thermometer was inserted in the center of each of the catalyst layers. The absorbing bottles A and B were immersed respectively in a constant temperature vessel kept at 50° C to maintain the temperature of the catalysts constant. Oxygen was passed through the absorbing bottle A, and nitrogen was passed through the absorbing bottle B. Thus, the spent catalyst in the absorbing bottle A was oxidized depending on its oxidizability, and heat was generated. But since the spent catalyst in the absorbing bottle B scarcely changed, a temperature difference existed between the two catalyst layers. This temperature difference was detected by a thermostat thermometer, and made an oxidative-exothermic temperature. Changes with time of the oxidative-exothermic temperature were determined after the initiation of oxygen feeding, and the results were evaluated on a scale of X which showed that the oxidative-exothermic temperature became extremely high within a prescribed time, and O which indicates that the oxidative-exothermic temperature was maintained at a low level within the prescribed time.

The above procedure was applied to spent catalysts wetted with various surface active substances and/or chelating agents illustrated in Table 1, and the results obtained are shown in Table 1. The results obtained with catalysts not subjected to the above wetting treatment are shown in Table 2 as Comparative Examples 1 to 3.

Table 1

| Ex. | Wetting Agents | | Oxidation-Heat Generation Test |
|---|---|---|---|
| 3 | 1% Benzotriazole<br>1% Diethylenetriamine | 98% Gas Oil | 0 |
| 4 | 1% N-Methylpyrrolidone<br>1% Diethylenetriamine | 98% Gas Oil | 0 |
| 5 | 0.1% Benzotriazole | 99.9% Water | 0 |
| 6 | 1% Commercially Available Detergent of the Alkylbenzene Sulfonate Type<br>0.1% Ethylenediaminetetraacetic Acid | 98.9% Water | 0 |
| 7 | 0.5% Polyethylene Glycol Tallow Fatty Acid Ester<br>0.1% Ethylenediaminetetraacetic Acid | 99.4% Water | 0 |
| 8 | 1% Amino Acid<br>0.1% Ethylenediaminetetraacetic Acid | 98.9% Water | 0 |

Table 1-continued

| Ex. | Wetting Agents | | Oxidation-Heat Generation Test |
|---|---|---|---|
| 9 | 0.5% Octadecyltriammonium Chloride<br>0.1% Ethylenediaminetetraacetic Acid | 99.4% Water | 0 |

Table 2

| Comparative Example | Treating Means for Spent Catalyst | Oxidation-Heat Generation Test |
|---|---|---|
| 1 | The spent catalyst was not washed | X |
| 2 | The spent catalyst was washed only with water | X |
| 3 | The spent catalyst was washed only with a gas oil | X |

It can be seen from the results in Tables 1 and 2 that the spent catalysts treated by the method of this invention exhibit lower oxidative-exothermic temperatures than those of the Comparative Examples, and therefore, the spontaneous combustion of the catalysts at the time of removal can be prevented.

While the invention has been described in detail and with reference to specific embodiments thereof, it will be apparent to one skilled in the art that various changes and modifications can be made therein without departing from the spirit and scope thereof.

What is claimed is:

1. A method of treating a catalyst used in the desulfurization or cracking of a hydrocarbon oil in a reactor, which comprises:
   a. washing said catalyst by the addition of mineral oil followed by wetting said catalyst by the addition to the mineral oil in a concentration of at least about 0.1% by weight of the mineral oil of
      i. an oleophilic surface active substance, or
      ii. an oleophilic surface active substance and a chelating agent;
   for a period of time sufficient to reduce dust scattering and to prevent spontaneous combustion of the catalyst upon removal and at a temperature of from about 20° to about 300° C; followed by
   b. removing the liquid present in the reactor; and
   c. removing the thus-treated catalyst from the reactor.

2. The method of claim 1, wherein the concentration of said oleophilic surface active substance or the combination of said oleophilic surface active substance and said chelating agent in said mineral oil is about 0.1 to about 20% by weight.

3. The method of claim 1, wherein said chelating agent is selected from the group consisting of sodium ethylenediaminetetraacetate, sodium nitrilotriacetate and sodium gluconate.

4. The method of claim 1, wherein said oleophilic surface active substance is selected from the group consisting of benzotriazoles, pyrrolidones, indoles, oleophilic anionic surface active agents, cationic surface active agents, amphoteric surface active agents and non-ionic surface active agents.

5. The method of claim 1, wherein said mineral oil is selected from the group consisting of kerosene, gas oils and atmospheric residual oils which have a reduced asphaltene content and which are rich in aromatics.

6. The method of claim 1, wherein said mineral oil containing the surface active substance or the surface active substance and the chelating agent is at a temperature of about 50° to 300° C.

7. The method of claim 1, wherein said mineral oil is a fresh gas oil.

8. The method of claim 1, wherein said mineral oil is a feed gas oil.

9. The method of claim 1, wherein the concentration of said oleophilic surface active substance or the combination of said oleophilic surface active substance and said chelating agent in said mineral oil is about 1 to 7% by weight.

10. A method of treating a catalyst used in the desulfurization or cracking of a hydrocarbon oil in a reactor, which comprises:
   a. wetting said catalyst with
      i. mineral oil and an oleophilic surface active substance in a concentration of at least about 0.1% by weight of the mineral oil, or
      ii. mineral oil, and in a concentration of at least about 0.1% by weight of the mineral oil, a combination of an oleophilic surface active substance and a chelating agent;
   for a period of time sufficient to reduce dust scattering and to prevent spontaneous combustion of the catalyst upon removal and at a temperature of from about 20° to about 300° C;
   followed by
   b. removing the liquid present in the reactor; and
   c. removing the thus-treated catalyst from the reactor.

* * * * *